United States Patent [19]
Tsuji et al.

[11] Patent Number: 5,666,572
[45] Date of Patent: Sep. 9, 1997

[54] CAMERA

[75] Inventors: Kenji Tsuji, Kashiwara; Yasuaki Serita, Sakai; Toshihito Kido, Matsubara; Hiroyuki Okada, Sakai, all of Japan

[73] Assignee: Minolta Co., Ltd., Osaka, Japan

[21] Appl. No.: 511,523

[22] Filed: Aug. 4, 1995

[30] Foreign Application Priority Data

Aug. 9, 1994 [JP] Japan ..................... 6-187085

[51] Int. Cl.$^6$ .................. G03B 7/00; G03B 7/26
[52] U.S. Cl. .................. 396/207; 396/284; 396/277
[58] Field of Search .................. 354/21, 484, 275; 396/207, 284, 277

[56] References Cited

U.S. PATENT DOCUMENTS 5,321,455 6/1994 Cocca .................................. 354/207
5,467,155 11/1995 Miyazaki et al. ..................... 354/21

FOREIGN PATENT DOCUMENTS 5-232571 9/1993 Japan.

Primary Examiner—Michael L. Gellner
Assistant Examiner—Daniel Chapik
Attorney, Agent, or Firm—Sidley & Austin

[57] ABSTRACT

A camera, which uses a film cartridge having a film exposure status display, comprises an E2PROM. The E2PROM stores the fact that the film status determination operation is underway when film status determination operation is underway. When a power supply is removed while the film status determination is operating and then the power supply is mounted, the camera operates an initial process. The film exposure status display is set in 'exposed' because the E2PROM holds that the film status determination operation is underway. A camera is provided that deems the film in the film cartridge to have been exposed and does not perform exposure if the power supply is cut off while the determination of the film status of the film in the film cartridge mounted in the camera is underway.

5 Claims, 10 Drawing Sheets

CAMERA

BACKGROUND OF THE INVENTION

1. Field of the Invention

This invention pertains to a camera, and more particularly to a camera employing a film cartridge that can display the status of the film, including whether or not the film has been exposed.

2. Description of the Related Art

Among the types of film cartridges mounted in a camera is a cartridge having a bar code disk that displays film information, including film type (negative/positive, color/monochrome, etc.), film speed, number of exposure flames, etc. This bar code disk is affixed to one end of the spool used for winding the film, and is externally visible. The camera reads this film information and uses it as data on which to determine the conditions of photo-taking. In other words, when the film cartridge is mounted in a camera, the spool of the film cartridge is made to rotate, and the bar code formed on the bar code disk is read by a sensor contained in the camera.

On the other hand, a film status display plate that displays the status of the film, such as whether or not the film has been exposed, is affixed to the other end of the spool. The film status is displayed by means of the position (angle) at which the display plate stops so that the film status may be seen at a glance. Furthermore, because a bar code disk is also affixed to the spool, the film status may also be known from the position at which this bar code disk stops.

In a camera in which this type of film cartridge is used, it is preferable for the camera itself to automatically determine the film status to prevent double exposure, etc. This automatic determination can be made by reading the bar code disk. In other words, the film status may be determined by driving the spool so that the bar code disk rotates while the bar code is read using a sensor and by seeking the initial position (angle) based on the bar code read until a prescribed bar code display appears. This determination method is superior in that it allows determination of the film status by employing the sensor for the reading of the bar code.

However, in this method, if the power to the control circuit is cut off while the spool is rotating because the battery is removed from the camera, for example, the film status display becomes incomplete during said rotation. Moreover, the data read up to that point is lost. Consequently, even if a new battery is mounted, since only the bar code beginning from the position at which the rotation terminated is known, the camera cannot determine the film status.

SUMMARY OF THE INVENTION

The object of the present invention is to provide a camera that determines the film to have been exposed where the film status cannot be determined, such that exposure is not performed so as to avoid double exposure on film already exposed. Another object of the present invention is to provide a camera that deems the status of the film in the film cartridge to have been exposed and does not perform exposure when the power is cut off while the spool is rotating to determine the film status of the mounted film cartridge.

To achieve said objects, a camera with the construction described below is provided by the present invention.

In other words, this camera employs a film cartridge equipped with a bar code disk that rotates with the spool as a single unit and constructed such that the exposure status of the film is indicated by the angle of the spool relative to a prescribed position when the rotation stops, wherein said camera comprises a drive mechanism that drives the spool of the film cartridge mounted in the camera, causing it to rotate, a detector that detects the pattern of said bar code disk while said spool is rotating, a determining means that determines the exposure status of the film based on the pattern information detected by said detector, a memory that holds in memory the fact that the process of determining the exposure status of the film mounted in the camera is underway, and a setting means that, when a battery is mounted in the camera and the fact of said determining process being underway is held in said memory, sets the position of the spool to the 'exposed' position.

By means of said construction, a camera is provided that deems the film in the film cartridge to have been exposed and does not perform exposure if the power is cut off while the determination of the film status of the film in the film cartridge mounted in the camera is underway.

These and other objects, advantages and features of the invention will become apparent from the following description thereof taken in conjunction with the accompanying drawings which illustrate a specific embodiment of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

A camera of one embodiment of the present invention shown in FIGS. 1 through 19 will be explained in detail below.

First, the film cartridge used in this camera and the construction of the camera itself will be explained with reference to FIGS. 1 through 14.

Figure 3:
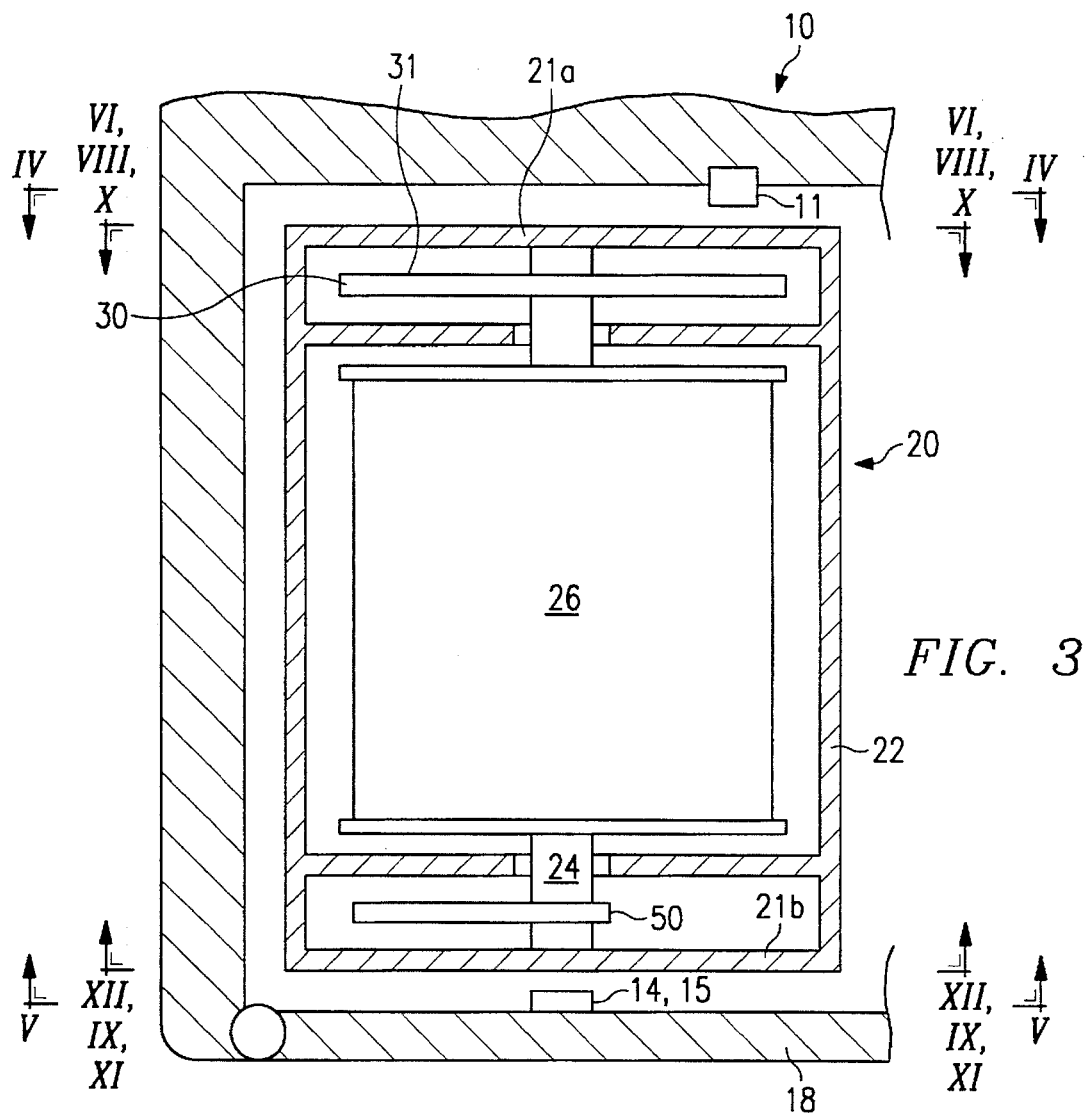
FIG. 3 is a cross-section of the important area of the camera of the embodiment of the present invention.

As shown in FIG. 3, the opening of cover 18 mounted on the bottom of camera 10 reveals film cartridge 20 housed in film cartridge bay 16 located inside camera 10.

Figure 1:
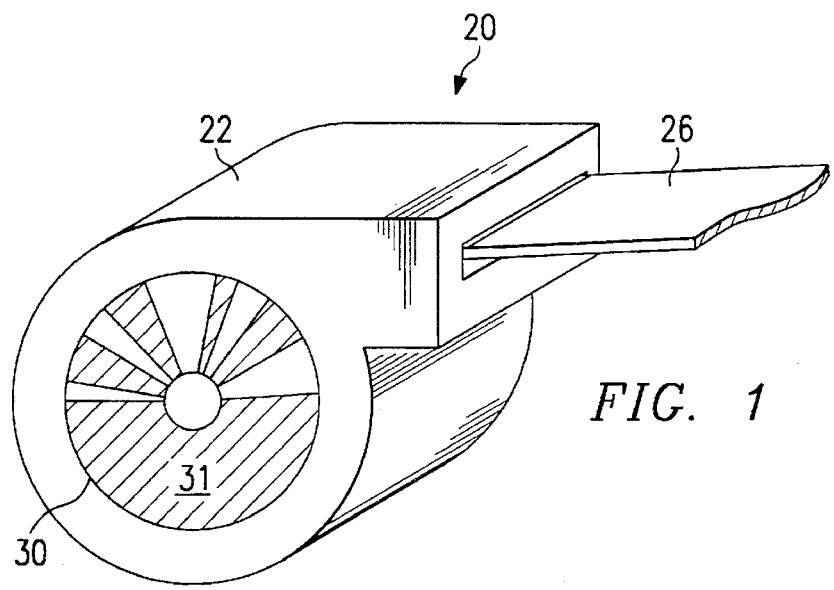
FIG. 1 is a perspective view of a film cartridge employed in a camera of one embodiment of the present invention.

As shown in FIGS. 1 and 3, film 26 wound around spool 24 inside cartridge case 22 is housed in film cartridge 20. On one end of spool 24 is formed an engagement groove (not shown in the drawings), and when film cartridge 20 is mounted in camera 10, this engagement groove engages with a claw on a drive spool (not shown in the drawings) mounted in camera 10. The drive spool mounted in camera 10 is driven by a motor (not shown in the drawings).

Figure 4:
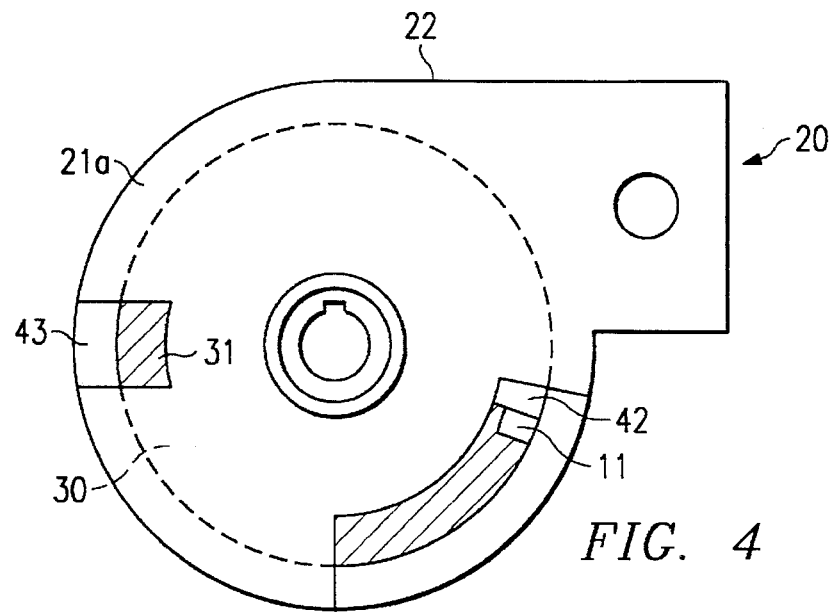
FIG. 4 is a cross-section of the film cartridge cut along line IV—IV of FIG. 3.
Figure 5:
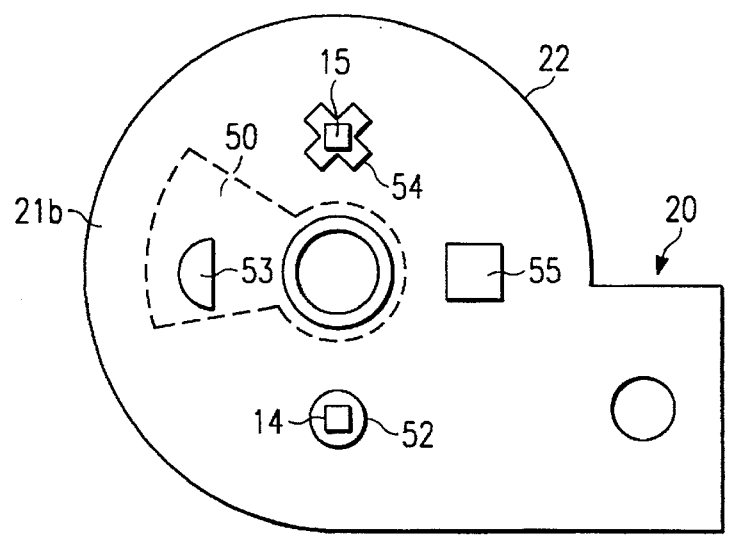
FIG. 5 is a cross-section of the film cartridge cut along line V—V of FIG. 3.

As shown in FIGS. 3 through 5, bar code disk 30, on the top surface 31 of which is formed a bar code in a radial fashion, is affixed at the upper end of spool 24. At the lower end of spool 24 is affixed film status display plate 50, which is a more or less fan-shaped reflector. Disk 30 and display plate 50 rotate inside case 22 of film cartridge 20 as a single unit with spool 24. In addition, portions of disk 30 and display plate 50 are visible from the outside of the film cartridge.

Figure 2:
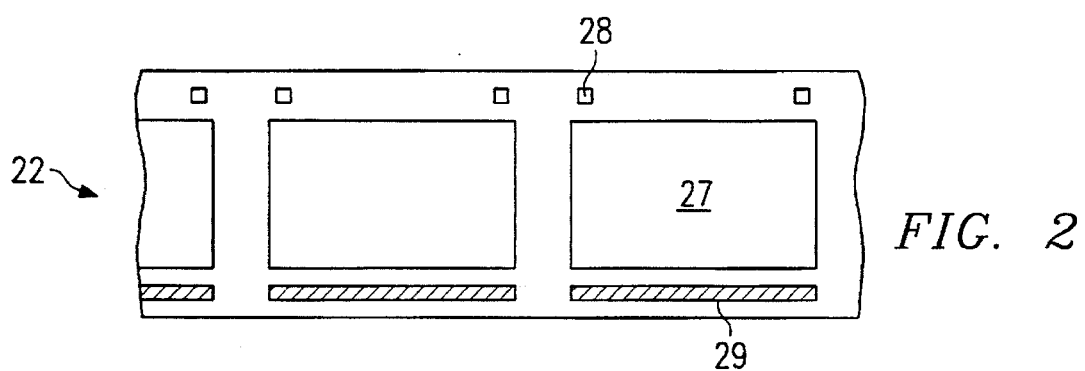
FIG. 2 is a plan view of the film of the film cartridge in FIG. 1.

As shown in FIG. 2, perforations 28 are formed on the upper edge of film 26 and magnetic recording members 29 are formed on the lower edge of film 26. One frame 27 is exposed corresponding to one set of perforations 28. In other words, the positioning of fromes 27 is determined using these perforations 28 when film 26 is forwarded to the next exposure frame. Magnets are spread on each magnetic recording member 29, as to which both magnetic recording and replay are possible.

Corresponding to each exposure frame (not shown in the drawings), camera 10 has photoreflectors PR3 (not shown in the drawings) for detection of perforations 28 on film 26 and a magnetic head (not shown in the drawings) to record data on magnetic recording members 29 on film 26.

As shown in FIG. 5, display windows (see-through holes) 52 through 55 are formed in four positions on bottom wall 21b of film cartridge 20. The white surface of film status display plate 50 is visible by means of these display windows 52 through 55, thereby displaying the film status.

In other words, round 'not exposed' display window 52 indicating that film 26 has not been used and may be employed for photo-taking, semicircular 'partially exposed' display window 53 indicating that some frames 27 of film 26 have been exposed, x-shaped 'exposed' display window 54 indicating that all frames 27 of film 26 have been exposed, and square 'processed' display window 55 indicating that film 26 has been developed are formed around a circle at 90-degree angles to one another. Each display window 52 through 54 is white when film status display plate 50 is positioned in it, while it is black at all other times.

In this way, the film status can be visually displayed depending on which one of display windows 52 through 55 film status display plate 50 that rotates together with spool 24 is positioned in. This display is also called a VEI mark.

Camera 10 controls the rotation of the drive spool such that spool 24 of film cartridge 20 stops at a prescribed position (angle) and film cartridge 20 displays a prescribed film status when it is removed from camera 10.

In addition, as shown in FIGS. 3 and 5, there are photo reflectors 14 and 15 located in the lower part of film cartridge bay 16 to face 'not exposed' display window 52 and 'exposed' display window 54 in film cartridge 20 housed in camera 10 such that the displays in display windows 52 and 54 are detected.

As shown in FIG. 4, display windows 42 and 43 are formed on upper wall 21a of film cartridge 20 such that a portion of the top surface 31 of bar code disk 30 is visible from these display windows 42 and 43. Or, as shown in FIG. 1, all of top surface 31 of bar code disk 30 may be visible. Camera 10 may be used with either type of film cartridge 20. Because this bar code disk 30 is affixed to spool 24 and rotates together with it as one unit, the film status may be known using the bar code display as well.

Figure 14:
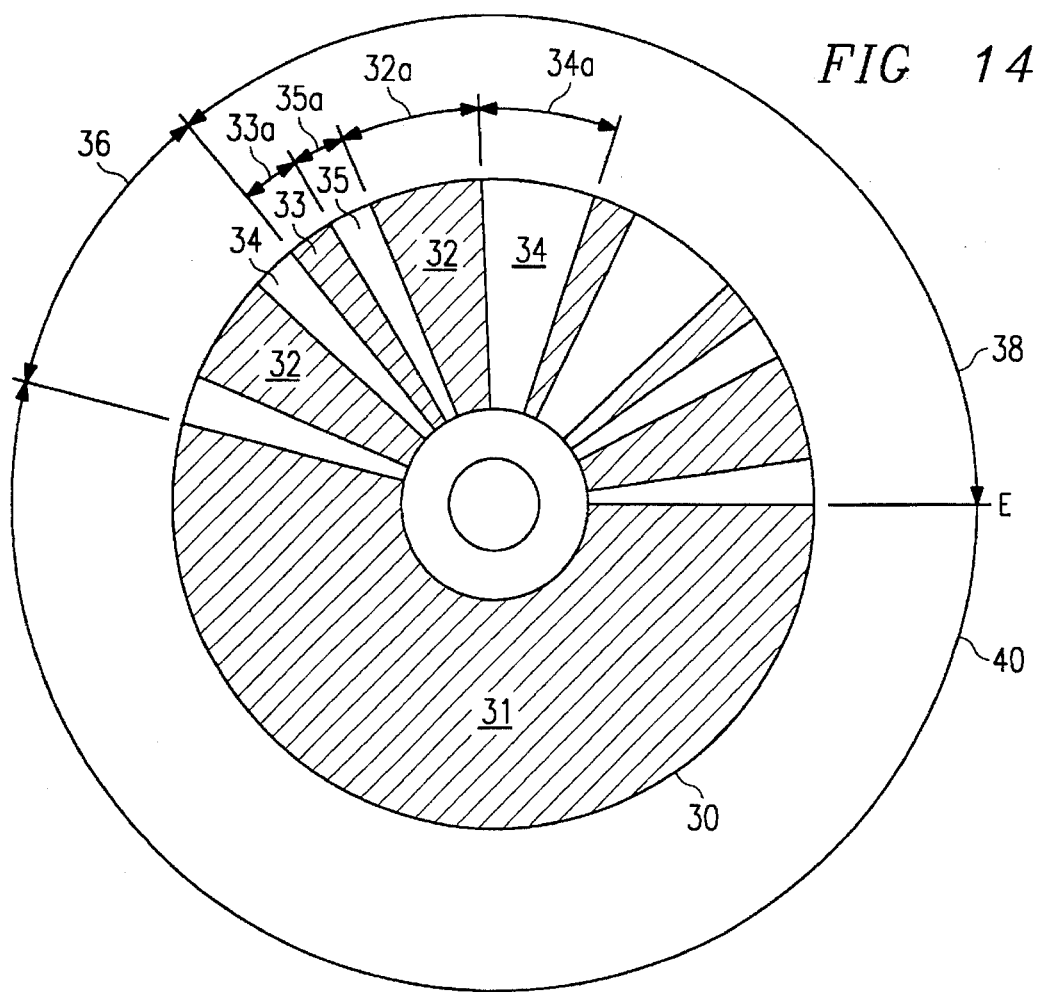
FIG. 14 is a plan view of a bar code disk.

As shown in FIG. 14, the bar code on top surface 31 of bar code disk 30 comprises exposure total display area 36 that indicates the total number of exposures on film 26, film speed/type display area 38 that indicates the film speed and type (e.g., negative/positive, color/monochrome, etc.), and non-display area 40. Exposure total display area 36 and film speed/type display area 38 comprise spaces 34 and 35 that are white in the drawing and bars 32 and 33 indicated by shaded areas, which are black in actuality. As bars 32 and 33 and spaces 34 and 35, there are wide bits 32 and 34 having a wide angle of 20° and narrow bits 33 and 35 having narrow angles 33a and 35a of 8°.

Exposure total display area 36 consists of 3 bits. This combination may be either a first combination in which one bit is wide bit 32 or 34 and two bits are narrow bit 33 or 35, or a second combination in which two bits are wide bit 32 or 34 and one bit is narrow bit 33 or 35. The angle of this area 36 is 36° in the case of the first combination (20°×1+ 8°×2), and 48° in the case of the second combination (20°×2+8°×1). Incidentally, FIGS. 1 and 14 show the first combination, while FIGS. 6, 8, 10 and 12 show the second combination. Film speed/type display area 38 has two wide bars 32 and wide spaces 34 and three narrow bars 33 and narrow spaces 35, and the angle of this area 38 is fixed at 128° {(20°×2+8°×3)×2}.

Non-display area 40 comprises only a shaded area in the drawing, which is actually black, and has an angle of 196° when the angle of exposure total display area 36 is 36° (360°−36°−128°) and 184° when it is 48° (360°−11°−128°).

On the other hand, as shown in FIGS. 3 and 4, photoreflector 11 is located in the upper portion of film cartridge bay 16 of camera 10, opposite display window 42 of film cartridge 20 housed in cartridge bay 16, such that the bar code on bar code disk top surface 31 may be read.

Incidentally, because bar code disk 30 and film status display plate 50 of film cartridge 20 are affixed to spool 24, the position, i.e. angle of rotation, of bar code disk 30 has a certain relationship to the film status display.

Here, the relationship to the film status display is explained below where, as shown in FIGS. 6 through 13, the line connecting the axis of door opening/closing shaft 25 that opens and closes the door (not shown in the drawings) located at film outlet 23 of film cartridge 20 and the axis of spool 24 is standard line —L—, the line dividing film speed/type display area 38 and non-display area 40 of bar code disk top surface 31 is line E, and the angle between standard line —L— and line E when traveling in a counter-clockwise direction is angle R.

Figure 6:
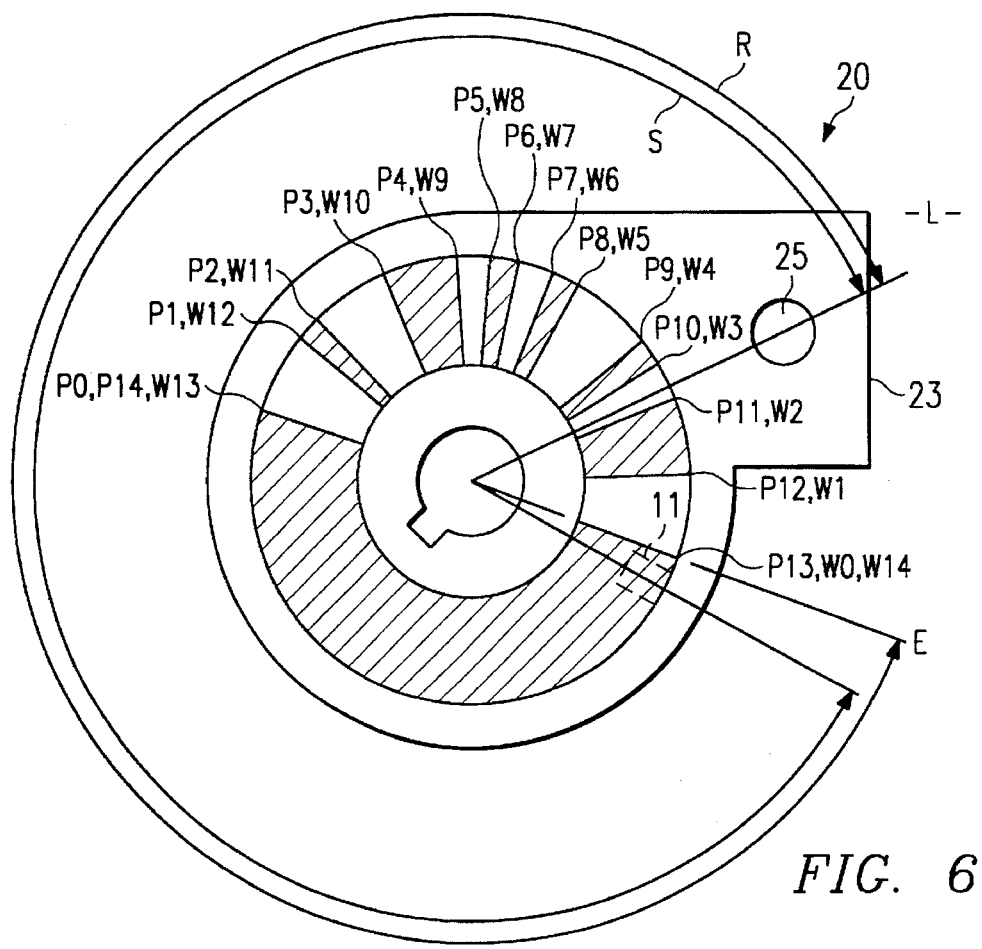
FIG. 6 is a cross-section of the film cartridge cut along line VI—VI of FIG. 3.
Figure 7:
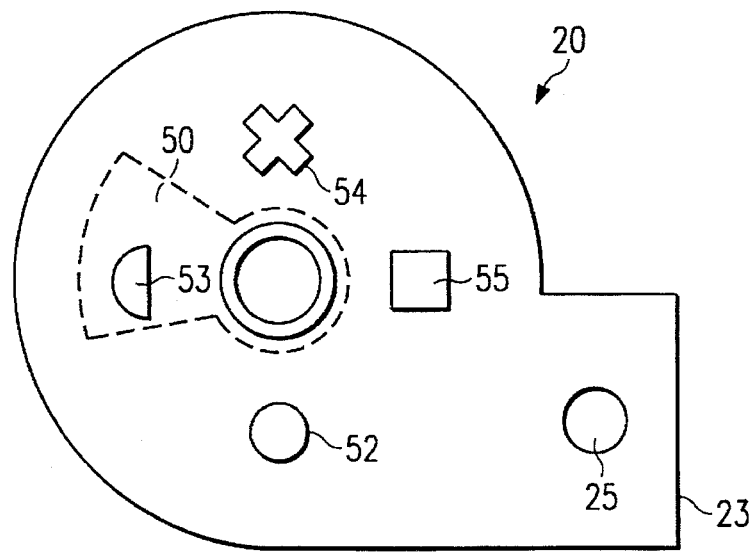
FIG. 7 is a cross-section of the film cartridge cut along line VII—VII of FIG. 3.
Figure 8:
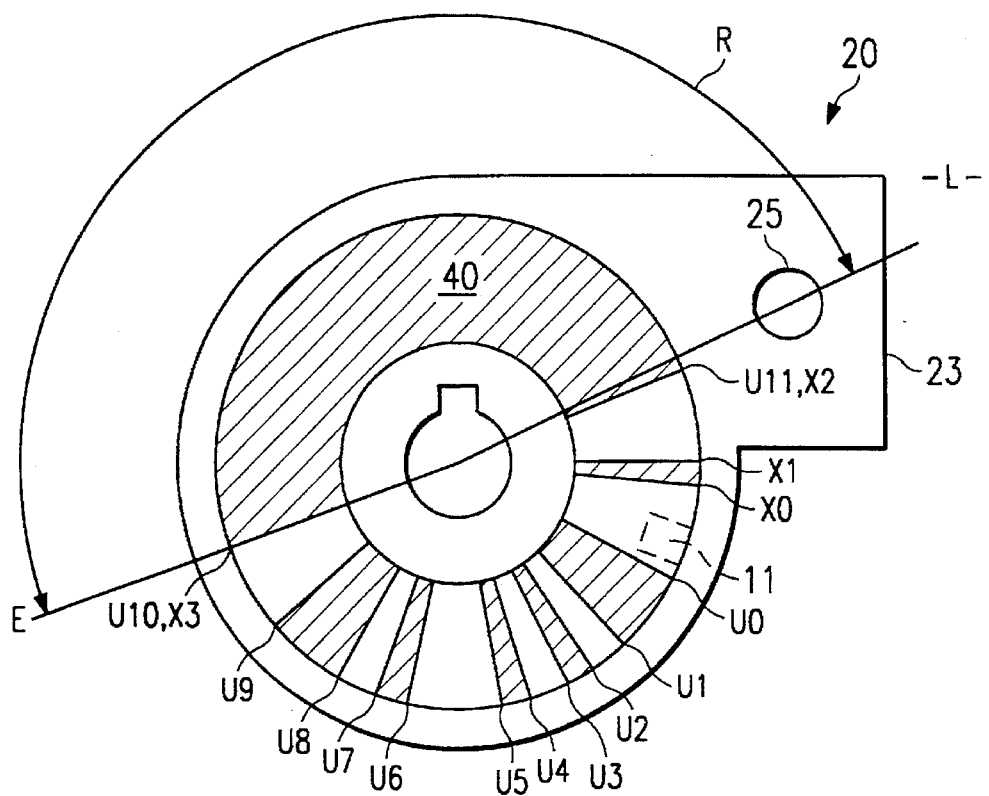
FIG. 8 is the same cross-section as FIG. 6, and shows the situation when the film is 'not exposed'.
Figure 9:
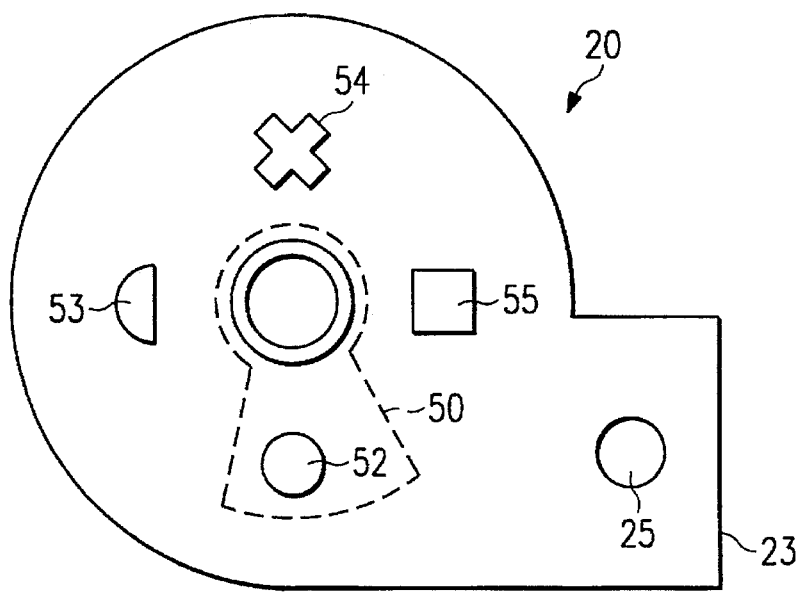
FIG. 9 is the same cross-section as FIG. 7, and shows the situation when the film is 'not exposed'.
Figure 10:
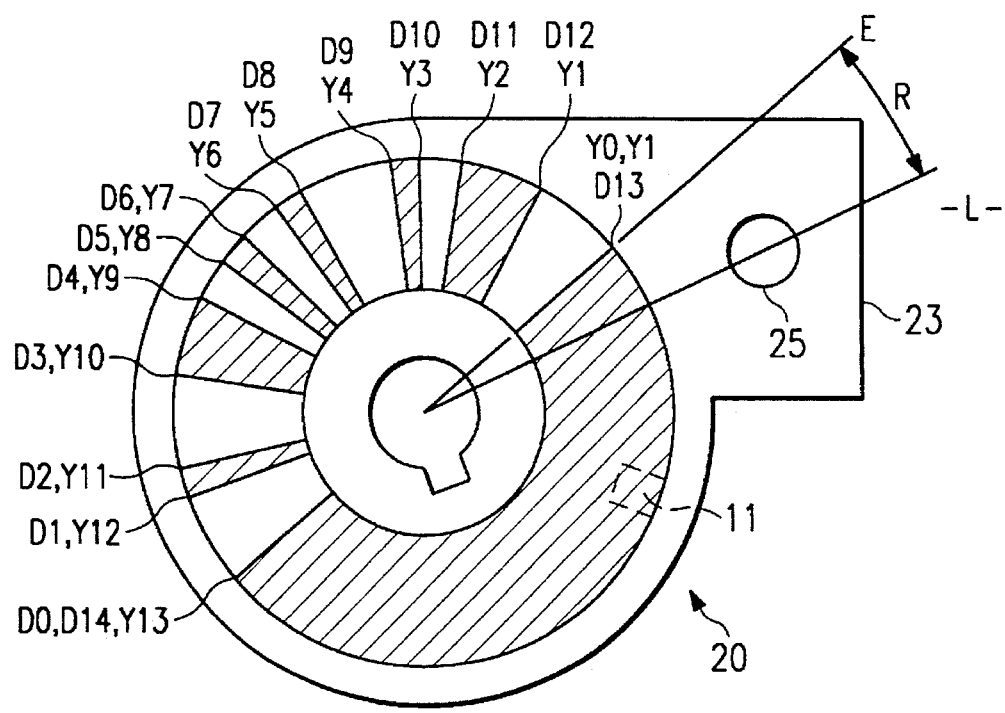
FIG. 10 is the same cross-section as FIG. 6, and shows the situation when the film is 'exposed'.
Figure 11:
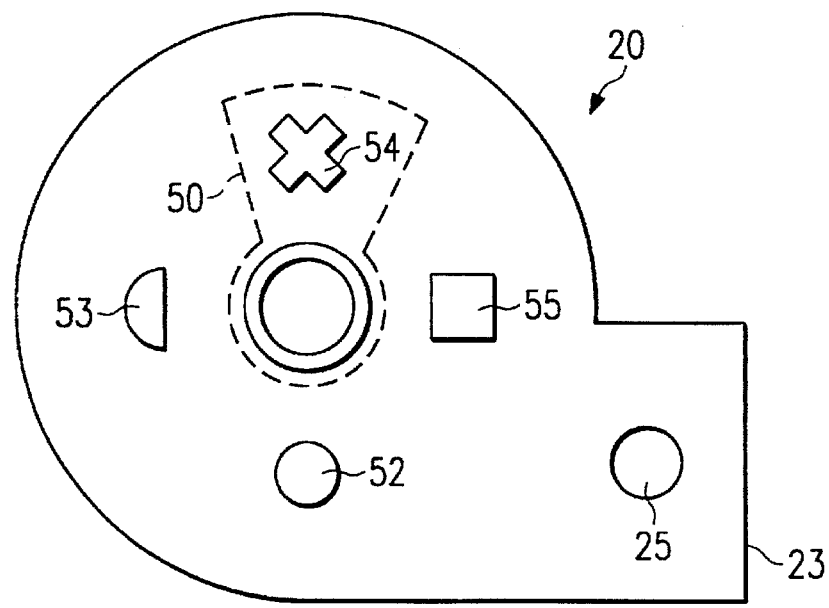
FIG. 11 is the same cross-section as FIG. 7, and shows the situation when the film is 'exposed'.

In other words, as shown in FIGS. 8 and 9, where film status display plate 50 is positioned in 'not exposed' display window 52 of film cartridge 20, and 'not exposed' is being displayed, R is 175.5°. As shown in FIGS. 6 and 7, where 'partially exposed' is being displayed, spool 24 has rotated 139.5° from the 'not exposed' display position, and R is 315.0°. As shown in FIGS. 10 and 11, where 'exposed' is being displayed, spool 24 has rotated 63° from the 'partially exposed' display position, and R, is 18.0°. Finally, as shown in FIGS. 12 and 13, where 'processed' is being displayed, spool 24 has rotated 63° from the 'exposed' display position, and R is 81.0°.

Figure 12:
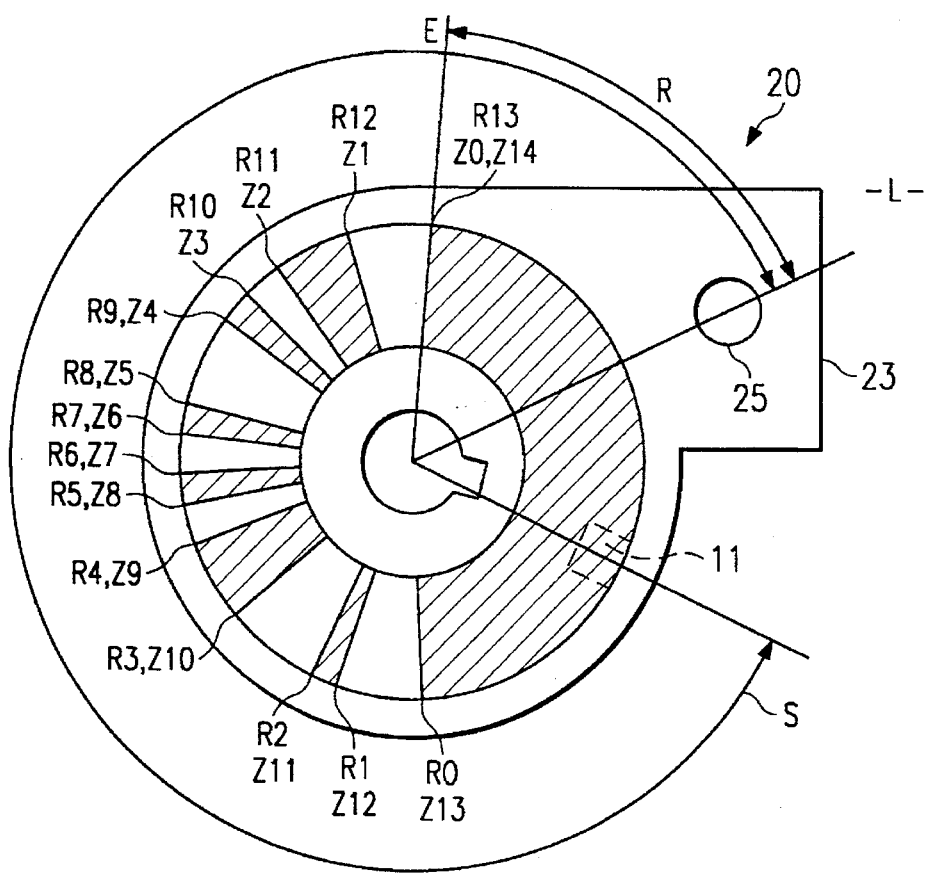
FIG. 12 is the same cross-section as FIG. 6, and shows the situation when the film has been processed.
Figure 13:
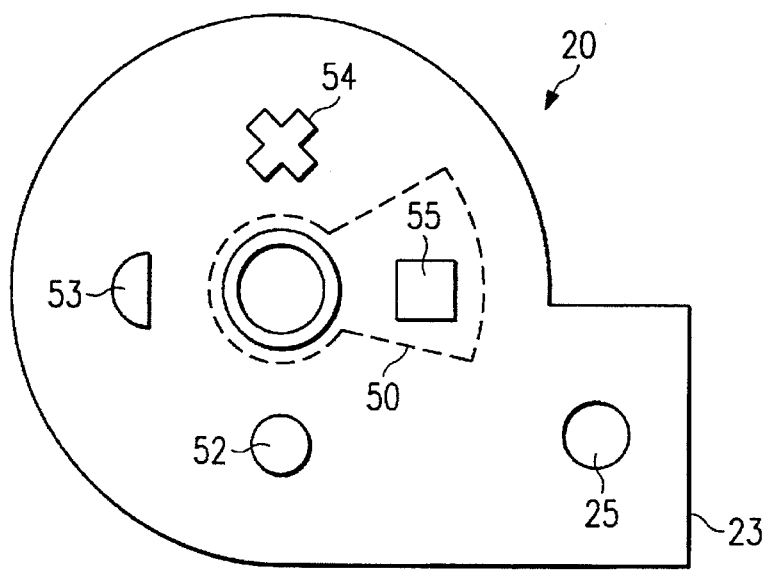
FIG. 13 is the same cross-section as FIG. 7, and shows the situation when the film has been processed.

In addition, as shown in FIG. 12, angle S between photoreflector 11 for reading the bar code and standard line —L— is 310.75°.

Figure 15:
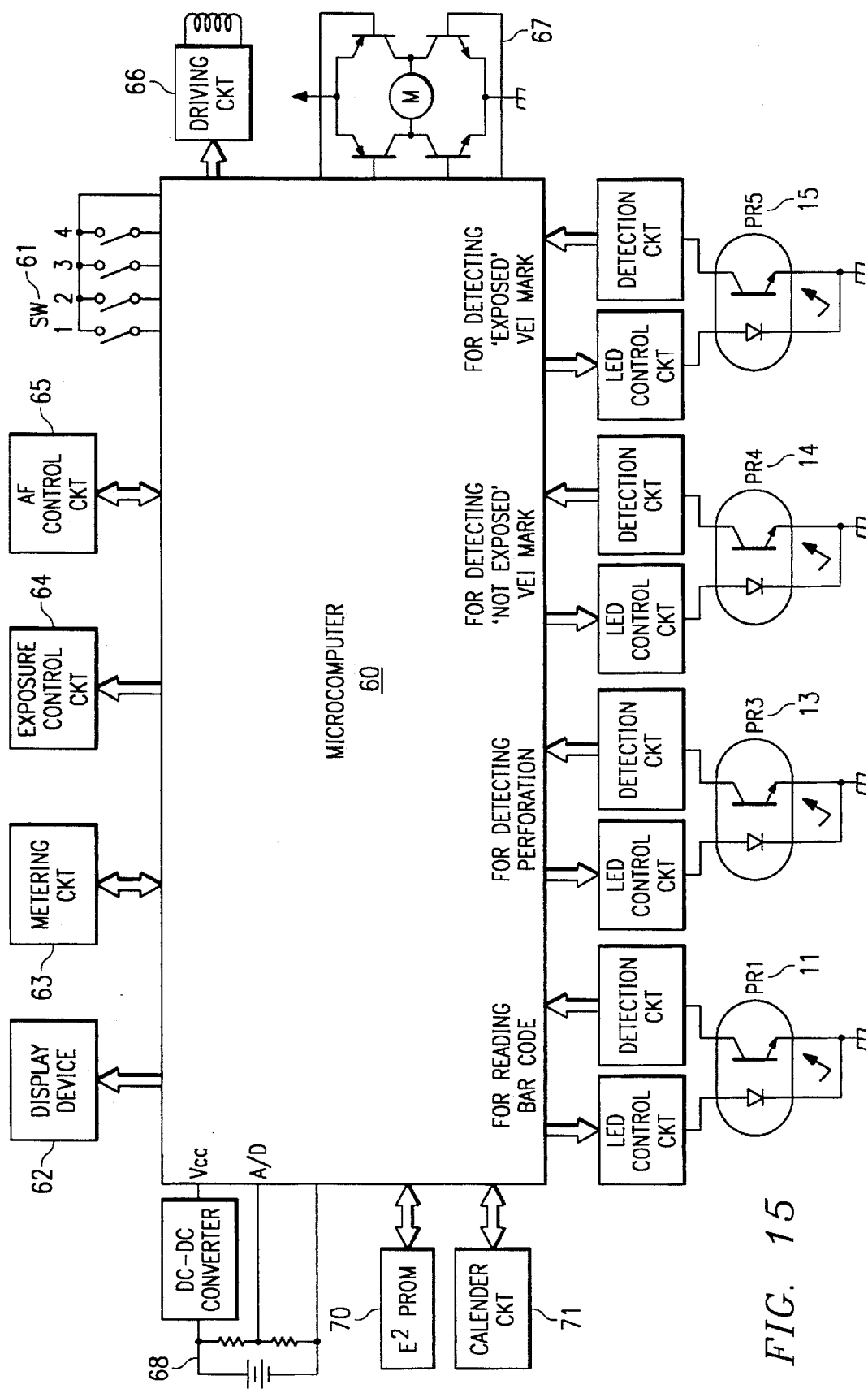
FIG. 15 is an electronic circuit diagram pertaining to the camera of the embodiment of the present invention.

The electronic circuitry of camera 10 will now be explained with reference to the electronic circuit diagram in FIG. 15.

Microcomputer 60 has a built-in CPU that works as a control means, a memory status determination means, etc., and is connected to E2PROM 70, a memory that is an electrically erasable PROM (an EEPROM, i.e., an electrically erasable and programmable read only memory) and a calendar circuit 71. E2PROM 70, a detailed explanation of which is provided below, is used to save the film determination status, and is a rewritable memory which does not lose its contents even if the power is turned off. Data regarding the year, month, date, minute, second and day of the week is obtained from calendar circuit 71.

Also connected to microcomputer 60 are power supply 68, display device 62, metering circuit 63, exposure control circuit 64, autofocus control circuit 65, driving circuit 66, motor drive circuit 67 and switches SW 61.

Display device 62 displays in connection with film 26 the film type, film speed, total number of exposures, remaining number of exposures, warnings, film status determination results, etc. Metering circuit 63 detects the brightness of the photo object. Exposure control circuit 64 controls the shutter speed and aperture value based on the film speed and the photo object's brightness. Autofocus control circuit 65 performs focusing of the lens as to the photo object. Driving circuit 66 drives magnetic head to writes data to magnetic recording members 29 on film 26. There are four switches SW: shutter switch SW1, cartridge existence switch SW2 that opens and closes depending on whether or not film cartridge 20 is housed in the camera, open/close switch SW3 that operates in conjunction with the opening and closing of cover 18, and manual rewind switch SW4. When switch SW4 turns on by manual operation, film rewinding starts even if last frame is not exposed. Motor drive circuit 67 performs driving of film 26 for forwarding and rewinding of the film. Power supply 68 provides power to the electronic circuitry.

Further connected to microcomputer 60, each via an LED control circuit and a detection circuit, are photoreflector 11 for reading the bar code, photoreflector 13 for detecting the perforations, photoreflector 14 for detecting the 'not exposed' VEI mark, and photoreflector 15 for detecting the 'exposed' VEI mark.

Figure 17:
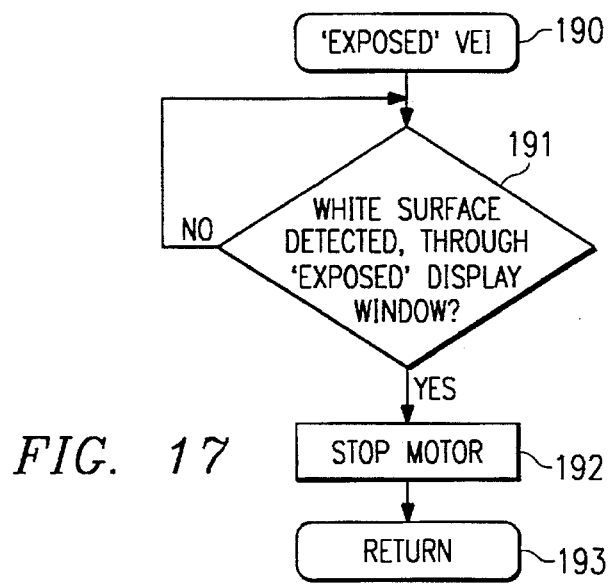
FIG. 17 is a detailed flow chart pertaining to the flow chart in FIG. 16.
Figure 16:
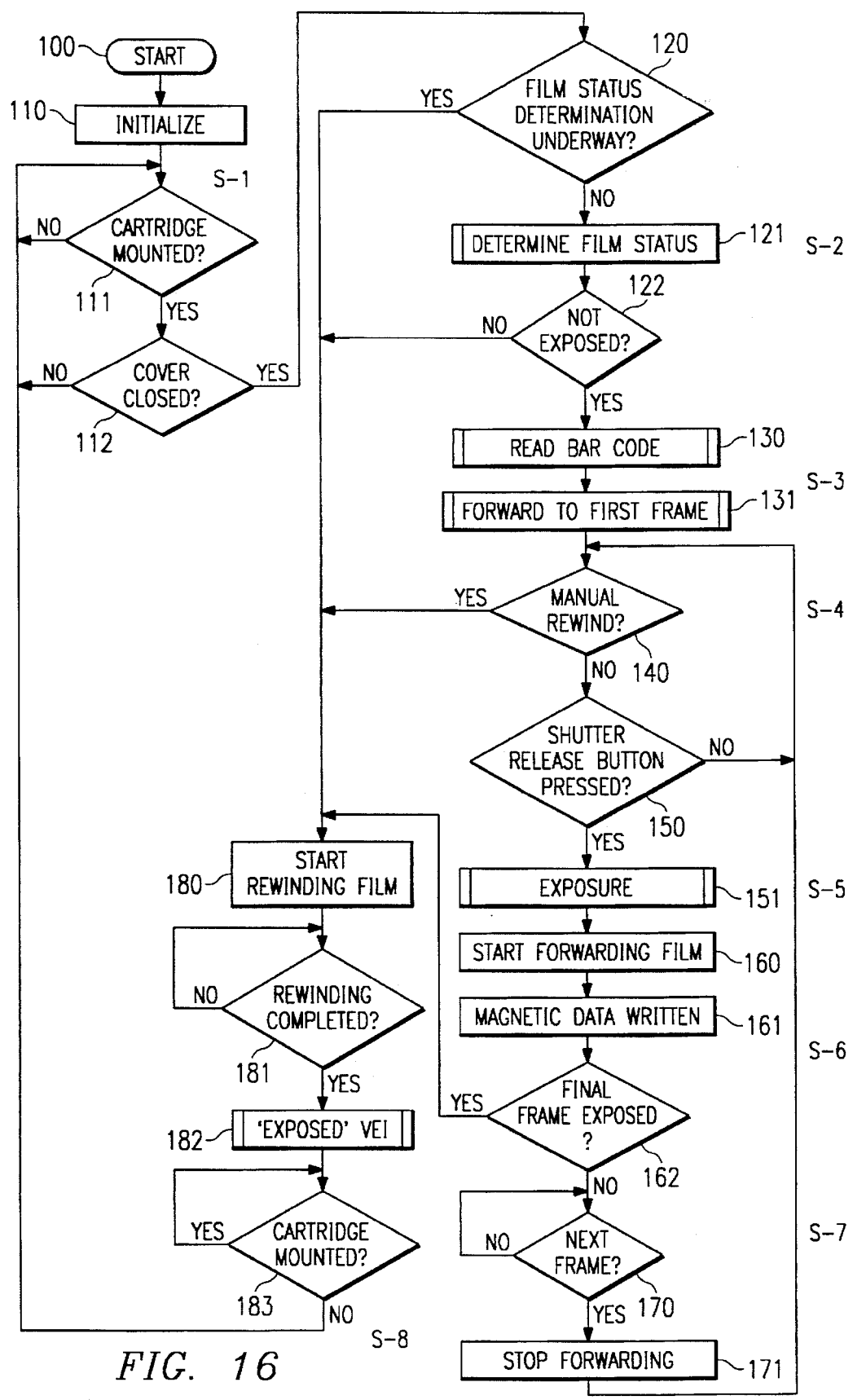
FIG. 16 is a comprehensive flow chart pertaining to the camera of the embodiment of the present invention.
Figure 18:
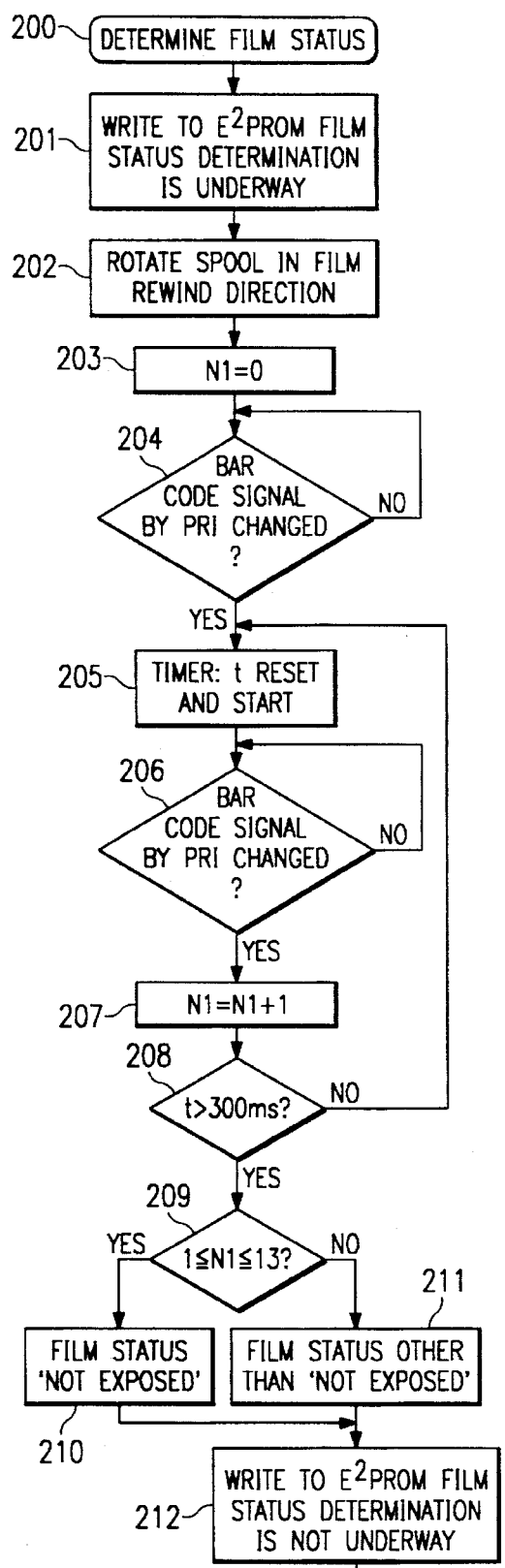
FIG. 18 is a detailed flow chart pertaining to the flow chart in FIG. 16.

The operation and construction of camera 10 will now be explained in detail with reference to the flow charts in FIGS. 16 through 18. FIG. 16 is a comprehensive flow chart and FIGS. 17 and 18 are detailed flow charts.

First, the outline of the operation of camera 10 will be explained with reference to the comprehensive flow chart in FIG. 16.

In other words, after initialization (Step 110), film cartridge 20 is mounted (Step 111), and camera 10 waits for cover 18 to be closed (Step 112)(S-1).

When film cartridge 20 is mounted and cover 18 is closed, the memory status determination means is operated (Step 120). That is, the E2PROM is read, and it is checked from said memory whether or not the film status determination operation is underway (Step 120). If the film status determination operation is underway, or if it is unclear whether it is underway, film 26 is rewound (Steps 180, 181) and the 'exposed' display drive operation (Step 182), i.e., the operation to rotate film status display plate 50 to the 'exposed' display position and stop it there, is begun. However, if the memory indicates that the film status determination operation is not underway, operation of the film status determination means, that is, determination of whether or not the film status is 'not exposed', is performed. Where it cannot be determined that the film status is 'not exposed', it is determined that the entire film has been exposed (S-2).

Where the result of the film status determination operation is 'not exposed', the control means is operated. In other words, spool 24 of film cartridge 20 is made to rotate, the bar code is read (Step 130), and film 26 is forwarded to the first exposure frame position (Step 131)(S-3).

. Where manual rewind switch SW4 is pressed (Step 140), the film in film cartridge 20 is rewound and the film status is displayed as 'exposed' (Steps 18014 183)(S-4).

When the shutter release button is pressed and shutter switch SW1 is closed (Step 150), focusing is performed, the shutter speed and aperture value are determined based on the information from metering circuit 63 and the film speed information, and film 26 is exposed (Step 151), In other words, photo-taking is performed (S-5).

After photo-taking is performed, film 26 is forwarded (Step 160). During this forwarding process, data is written to magnetic recording member 29 of film 26 (Step 161). The contents of this data include the date, shutter speed and aperture value. If the exposed frame was the final exposure frame (Step 162), spool 24 is stopped at the position. displaying 'exposed' (Step 162) (S-6).

When film 26 reaches the position of the next frame (Step 170), forwarding is stopped (Step 171). The position at which it is stopped is the position at which photoreflector 13 for detecting perforations detects the second set of perforations 28 (S-7).

The 'exposed' display via the 'exposed' display drive means (Step 182) is performed after the motor of camera 10 is started (Step 180) and film 26 is rewound (Step 181) inside film cartridge 20 via the rotation of spool 24 of film cartridge 20. In other words, after film rewinding is completed, film cartridge 20 displays 'exposed' (Step 182). Film cartridge 20 then waits to be removed from camera 10 (Step 183)(S-8).

The 'exposed' display is performed in accordance with the detailed flow chart in FIG. 17. That is, because the motor is rotating in order to perform film rewinding (See Step 180 in FIG. 16), film status display plate 50 is rotating. After film rewinding is complete, if photoreflector 15 for detecting the 'exposed' display detects reflected light from the film status display plate, or in other words a white surface, through 'exposed' display window 54 (Step 191), the motor is stopped (Step 192).

The film status determination operation in said flow chart (Step 121 in FIG. 16), i.e., the operation of the film status determination means, will now be explained in detail based on the detailed flow chart in FIG. 18.

When film status determination is begun (Step 200), first, the fact that the film status determination operation is underway is written to the E2PROM memory (Step 201). Spool 24 of film cartridge 20 is then caused to rotate in the film rewind direction, which is the direction that rewinds film 26 inside film cartridge 20, and bar code disk 30 is thus made to rotate (Step 202). N1 is then set to an initial value of '0' (Step 203).

While this rotation is proceeding, the number of changes the rising edge or the falling edge (also referred to as 'edge changes') of the bar code signals corresponding to the changes from a bar to a space or from a space to a bar on bar code disk 30 detected by photoreflector 11 for reading the bar code is counted as number of changes N1, and the interval between one edge change and the next edge change is counted as interval "t" by a timer. Each time an edge change is detected, interval "t" is compared with a prescribed threshold value 300 ms (Steps 204–208). If it is smaller than the threshold value, steps 205 through 208 described above are repeated, and if it is larger, it is determined whether the number of changes N1 falls within a prescribed range (Step 209). If number of changes N1 falls within a prescribed range, the film status is determined to be 'not exposed' (Step 210), and if it falls outside this range, the film status is determined to be other than 'not exposed' (Step 211).

Following this determination, the fact that the film status determination operation is not underway is written to the E2PROM (Step 212).

Film status display determination steps 200 through 213 described above utilize the fact that the bar code on bar code disk top surface 31 in film cartridge 20 is constructed according to a certain rule, as indicated above.

In other words, as shown in FIG. 14, because the angle of non-display area 40 is sufficiently large relative to bars 32 and 33 and spaces 34 and 35, the fact that non-display area 40 has been passed may be detected via comparison of interval "t" with the prescribed threshold value. If this fact that non-display area 40 has been passed can be detected, the initial position of bar code disk 30 may be deduced from number of changes N1, through reverse calculation.

The specific operations of steps 200 through 213 above, where 'not exposed' is displayed, will now be explained.

Bar code disk 30 rotates in a clockwise direction in the drawing (the direction in which film 26 is fed into cartridge 20) from the status shown in FIG. 8, until non-display area 40 passes through photoreflector 11. Photoreflector 11 detects white-black/black-white borders U0 through U11 in sequence. When the first white-black border U0 is detected (Step 204), the timer is reset and counting is begun (Step 205). When the next black-white border U1 is detected (Step 206), N1 becomes 1 (Step 207). Because the value of the counter at this time, i.e., interval "t" between U0 and U1, is smaller than the prescribed threshold value 300 ms, steps 205 through 208 above are repeated (Step 208). By repeating the process in sequence for U2, U3, and so on, N1 increases in increments of one (Step 207).

When U12 is detected, N1 becomes 12. Because interval between the detection of U11 and the detection of U12 is larger than threshold value 300ms (Step 208), the film status is determined according to whether N1 falls within a prescribed range (Step 209). Because N1 is 12 and satisfies the condition of being one or greater and 13 or less, the film status is determined to be 'not exposed' (Step 210).

The same process of determination is carried out for film status displays other than the 'not exposed' display. In other words, where 'partially exposed' is being displayed, bar code disk 30 has rotated at least once, and because the white-black/black-white borders detected by photoreflector 11 are P0 through P14, as shown in FIG. 6, N1 becomes 14. Similarly, in the case of the 'exposed' display, bar code disk 30 has rotated at least once, and as shown in FIG. 10, D0 through D14 are detected and N1 becomes 14. In the case of the 'processed' display as well, R0 through R14 are detected, as shown in FIG. 12, and N1 becomes 14.

Therefore, because no display other than the 'not exposed' display satisfies the condition $1 \leq N1 \leq 13$ (Step 209), the presence of a display other than 'not exposed' may be determined (Step 211).

Where power to the control circuit is cut off during said film status determination operation, due to removal of the battery from camera 10, etc., spool 24 of film cartridge 20 stops at an interim position. However, even if the power is cut off, the fact of the film status determination operation being underway remains in the E2PROM memory.

As a result, when another battery is replaced in the camera, and the sequence from the start operation (Step 100) in the flow chart in FIG. 16 is begun and when the presence in or absence from the E2PROM memory of the fact of the film status determination operation being underway is checked (Step 120), because the fact that the film status determination operation is underway resides in the E2PROM memory, the film cartridge displays the 'exposed' display (Step 182).

As described above, in the above embodiment, if the power from power supply 68 should be cut off while spool 24 is rotating for the detection of the status of the film in film cartridge 20 housed in the camera, the film status display of film cartridge 20 is made to display 'exposed'.

In the above embodiment, spool 24 of film cartridge 20 rotates in the direction of film rewinding, but film status determination is also available when it rotates in the opposite direction. An alternate embodiment involving said reverse rotation is explained below with reference to the flow chart in FIG. 19.

This alternate embodiment follows the same sequence as the previous embodiment, except that the direction of rotation of spool 24 of film cartridge 20 and the conditions of comparison regarding number of changes N1 and interval "t" differ.

In other words, first, the fact of the film status determination operation being underway is written to the E2PROM memory (Step 301), and then spool 24 of film cartridge 20 rotates in the direction of film forwarding (Step 302). While this rotation is proceeding, the changes from the rising edge to the falling edge of bar code signals and vice versa are detected by photoreflector 11 for reading the bar code. This number of edge changes is counted as N1 and the interval between one edge change and the next edge change is counted as interval "t" by the timer (Steps 305–308). Interval "t" is compared with the threshold value (Step 308) each time an edge change occurs, and when it exceeds the threshold value, number of changes N1 is compared with a prescribed value (Step 309). If number of changes N1 is equal to or less than the prescribed value, the film status is determined to be 'not exposed' (Step 310), and if it falls outside the prescribed range, the film status is determined to be other than 'not exposed' (Step 311). Following this determination, the fact that the film status determination operation is not underway is written to the E2PROM (Step 312).

Figure 19:
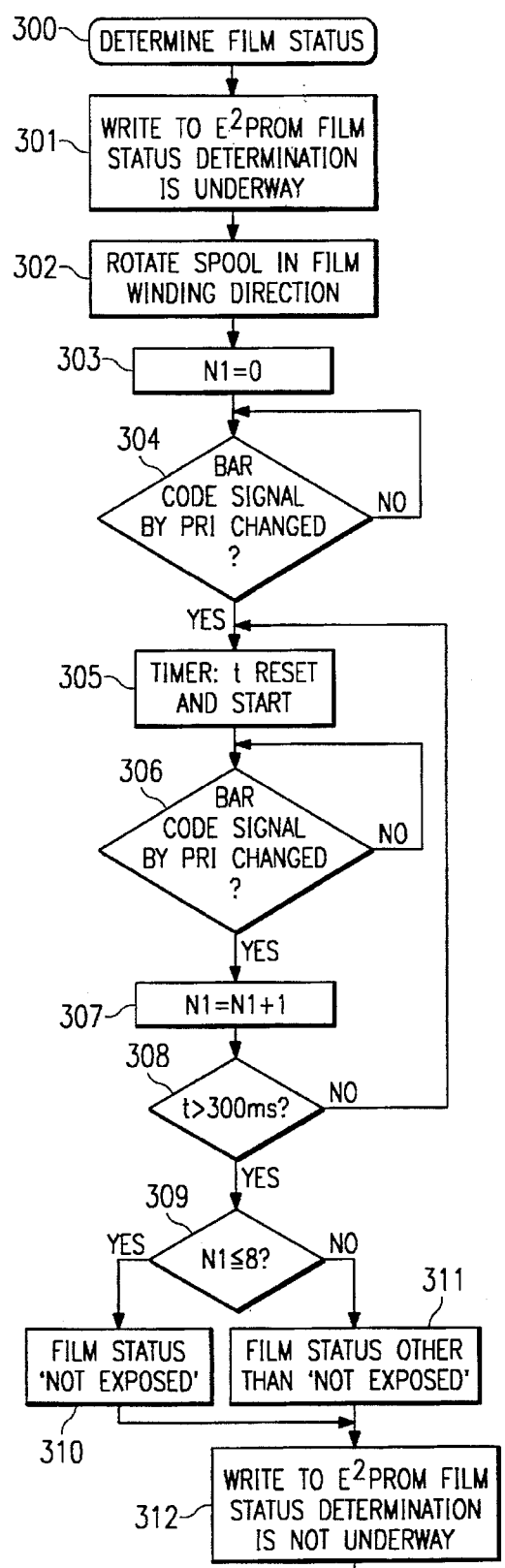
FIG. 19 is a flow chart showing a variation of the flow chart in FIG. 18.

Specifically, because the bar code disk rotates in a counter-clockwise direction in FIGS. 6, 8, 10 and 12, the black-white/white-black borders detected according to the flow chart in FIG. 19 are W0–W14, X0–X3, Y0–Y14 and Z0–Z14, and the values of N1 are 14, 3, 14 and 14, respectively, for each film status display. Therefore, since the condition N1≦8 is not satisfied in cases other than the 'not exposed' display, determination of the film status can be made according to the flow chart in FIG. 19.

Furthermore, the present invention is not limited to the embodiments described above, and various other types of configurations may be realized.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera, which uses a film cartridge including a film wound around a spool equipped with a bar code disk that rotates with the spool as a single unit and constructed so that an exposure status of the film is indicated by an angle of the spool relative to a prescribed position when the rotation stops, said camera comprising:

a drive mechanism that drives said spool of the film cartridge mounted in the camera;

a detector that detects a pattern of said bar code disk while said spool is rotating;

a determination circuit that determines the exposure status of the film based on the pattern information detected by said detector;

a memory that holds in memory the fact that the process of determining the exposure status of the film mounted in the camera is underway; and a setting device that, when the fact of said determining process being underway is held in said memory upon installation of a battery, sets the spool to the position which indicates the film is exposed.

2. A camera, which uses a film cartridge including a film wound around a spool at either end of which is affixed a bar code disk that displays film information and a display plate that can perform a film status display that displays film state that said film is exposed or not exposed, said camera including a reading device that reads said film information on said bar code disk, a film status determination circuit that determines the film status based on the bar code read by said reading device while said spool is made to rotate, a display drive device that makes the spool rotate and causes said display plate to display that said film is exposed, and a power supply, said camera further comprising:

a memory which holds contents stored in said memory even if said power supply is cut off, and which stores the fact that said film status determination operation is underway only during the period of time that said spool is rotating in order to perform said film status determination, and in all other cases stores the fact that said film status determination operation is not underway; and a controller that begins said film status determination operation when it is determined, at the time when said power supply is resumed, that said memory holds the fact that said film status determination operation is not underway, and that operates said display drive device when it is determined, at the time when said power supply is resumed, that said memory holds the fact that said film status determination operation is underway.

3. A camera, which uses a film cartridge having an information that a film is exposed or not exposed, said camera comprising:

a film status determination circuit that reads said information on said cartridge and determines the film exposure status based on said read information and memorizes that the exposure status cannot be determined: and a controller which causes said film cartridge to have an information that the film is exposed when the exposure status cannot be determined by said film status determination circuit.

4. A camera as claimed in claim 3, wherein said power supply is detachable and said film status determination circuit operates when the power supply is mounted in the camera.

5. A camera, which uses a film cartridge including a film wound around a spool at either end of which is affixed a bar code disk that displays film information and a display plate that can perform a film status display that displays film state that said film is exposed or not exposed, said camera comprising:

a film status determination circuit that causes said spool to rotate, reads the pattern information on said bar code disk, and determines the film exposure status based on the read pattern information and memorizes that the exposure status cannot be determined;

a display drive device that causes said spool to rotate to display said exposed status display on said display plate; and a controller that controls said display drive device so that said display plate indicates that film is exposed when the exposure status cannot be determined by the film status determination circuit.

* * * * *